(12) United States Patent
Calando et al.

(10) Patent No.: US 8,526,515 B2
(45) Date of Patent: Sep. 3, 2013

(54) LINK QUALITY METRIC BASED ANTENNA SELECTION FOR TRANSCEIVERS

(75) Inventors: Antoine Calando, Antibes (FR); Franck Fleter, Cagnes/mer (FR); Tobias Jensen-Lindstrøm, Aalborg (DK); Shashi Kant, Aalborg East (DK); Lisa Meilhac, Chanonat (FR); Joachim Wehinger, Taufkirchen (DE)

(73) Assignee: Wipro Limited, Bangalore (IN)

( * ) Notice: Subject to any disclaimer, the term of this patent is extended or adjusted under 35 U.S.C. 154(b) by 949 days.

(21) Appl. No.: 12/248,911

(22) Filed: Oct. 10, 2008

(65) Prior Publication Data

US 2010/0091891 A1    Apr. 15, 2010

(51) Int. Cl.
*H04K 1/10* (2006.01)
(52) U.S. Cl.
USPC .......................................................... 375/260
(58) Field of Classification Search
USPC ........ 375/227, 260, 285, 316, 346; 455/63.1, 455/133–135, 271.1, 272.2, 562.1
See application file for complete search history.

(56) References Cited

U.S. PATENT DOCUMENTS

| 6,922,549 B2 * | 7/2005 | Lyons et al. ................ 455/67.13 |
| 7,146,134 B2 | 12/2006 | Moon et al. |
| 7,289,828 B2 | 10/2007 | Cha et al. |
| 7,454,183 B2 * | 11/2008 | Moorti et al. ............... 455/277.1 |
| 7,515,939 B2 * | 4/2009 | Catreux-Erceg et al. ... 455/562.1 |
| 7,546,103 B1 * | 6/2009 | Kopikare et al. ........... 455/277.1 |
| 7,818,635 B2 * | 10/2010 | Tsukio et al. ................. 714/708 |
| 2004/0266375 A1 | 12/2004 | Li et al. |
| 2005/0186921 A1 | 8/2005 | Hoo et al. |
| 2005/0245298 A1 * | 11/2005 | Mori ........................... 455/575.7 |
| 2009/0257357 A1 * | 10/2009 | Marsh ........................... 370/252 |

OTHER PUBLICATIONS

Kant et al., "Fast Link Adaptation for IEEE 802.11n," Master thesis, Aalborg University, Denmark, Aug. 2007.

* cited by examiner

*Primary Examiner* — Khanh C Tran
(74) *Attorney, Agent, or Firm* — LeClairRyan, a Professional Corporation

(57) ABSTRACT

A method and system for link quality metric based antenna selection for transceiver are disclosed. In one embodiment, a method for selecting an antenna from multiple antennas associated with a receiver, includes receiving multi-carrier modulated signals via a currently active antenna of the receiver, and estimating a predicted packet error rate (PER) associated with a current receive path of the receiver. The current receive path is used to process the multi-carrier modulated signals. The method further includes selecting a next antenna from the multiple antennas for forming a next receive path of the receiver based on the predicted PER and a packet error history associated with at least one previous receive path.

21 Claims, 3 Drawing Sheets

LINK QUALITY METRIC BASED ANTENNA SELECTION FOR TRANSCEIVERS

FIELD OF TECHNOLOGY

Embodiments of the present invention relate to the field of electronics. More particularly, embodiments of the present invention relate to wireless communication.

BACKGROUND

A conventional technique for selecting an antenna in a receiver is based on the signal strength of a preamble of a data packet being introduced to the receiver through the antenna. In such a scheme, the signal strength of every antenna in the receiver is measured, where the receiver is often equipped with multiple antennas to enhance receive reliability of the packet. This typically involves considerable amount of time and/or power dissipation. In addition, due to hardware constraints in some orthogonal frequency divisional multiplexing (OFDM) architectures, the sequential switching through the multiple antennas to determine the reliability of the data packet may not be possible. Furthermore, the signal strength alone may not be sufficient to properly reflect the true reception quality of the packet in a wireless fading channel.

An alternative antenna selection criterion resorts to a long-term packet error rate (PER) evaluation by detecting an error in the packet (e.g., using a cyclic redundancy check (CRC)) introduced through each one of the multiple antennas in the receiver. Then, a long-term averaging of the error associated with each antenna may be compared against each other. However, this scheme may be too slow to react to more rapidly occurring changes in the receiver.

SUMMARY

A method and system for link quality metric based antenna selection for transceiver is disclosed. In one aspect, a system for selecting an antenna from multiple antennas associated with a receiver includes an antenna selection module for forwarding a control signal which triggers a switch from a currently active antenna of the receiver to a next antenna based on a predicted packet error rate (PER) associated with a current receive path of the receiver and a packet error history associated with at least one previous receive path. The system also includes a switch module for performing the switch from the currently active antenna to the next antenna based on the control signal.

In another aspect, a method for selecting an antenna from multiple antennas associated with a receiver includes receiving multi-carrier modulated signals via a currently active antenna of the receiver, and estimating a predicted PER associated with a current receive path of the receiver. The method further includes selecting a next antenna from the multiple antennas for forming a next receive path of the receiver based on the predicted PER and a packet error history associated with at least one previous receive path.

The methods, systems and apparatuses disclosed herein may be implemented in any means for achieving various aspects, and may be executed in a form of a machine readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follows.

DETAILED DESCRIPTION

A method and system of link quality metric based antenna selection for transceiver is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
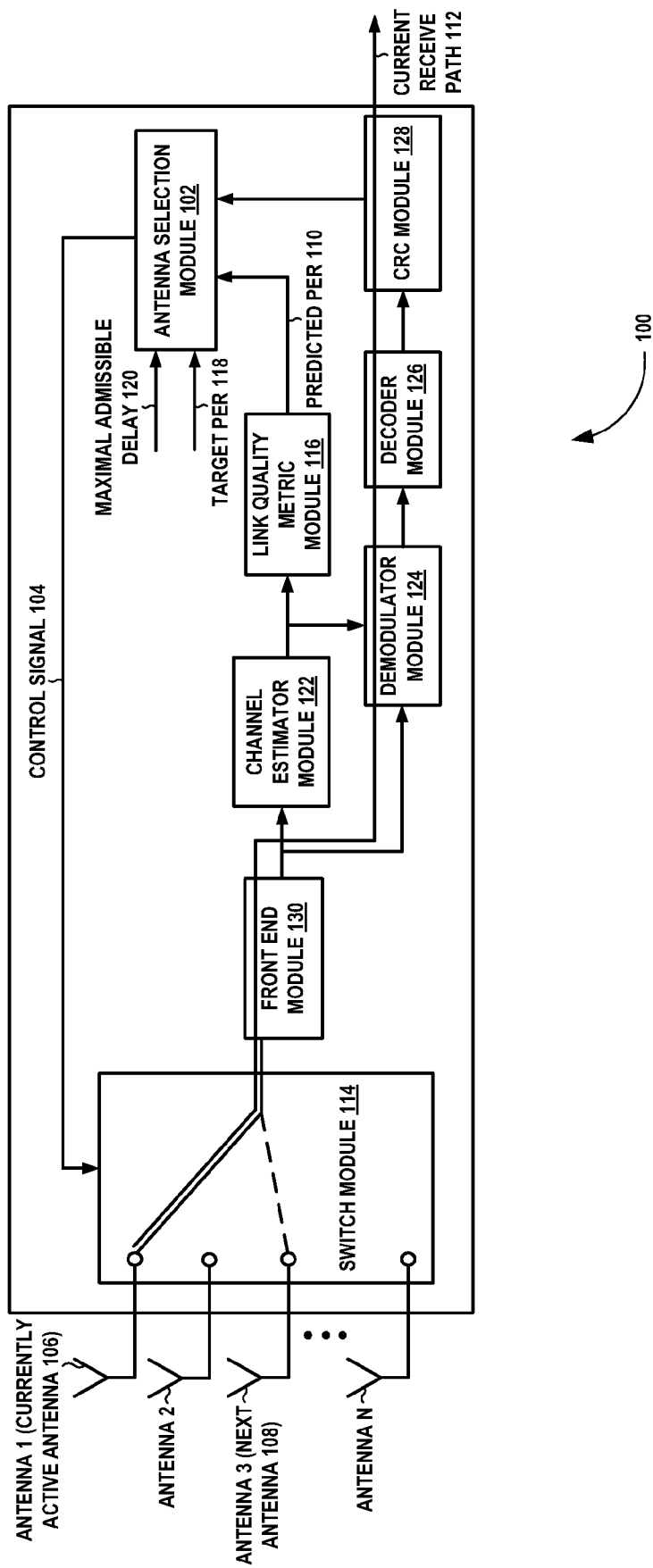
FIG. 1 is a block diagram of an exemplary system for selecting an antenna from multiple receiver antennas, according to one embodiment.

FIG. 1 is a block diagram of an exemplary system 100 for selecting an antenna from multiple receiver antennas 1 through N, according to one embodiment. Particularly, FIG. 1 illustrates a receiver 100 including the multiple receiver antennas 1 through N. As shown in FIG. 1, the receiver 100 includes an antenna selection module 102 for forwarding a control signal 104 which triggers a switch from a currently active antenna 106 of the receiver 100 to a next antenna 108. In one embodiment, the switch from the currently active antenna 106 of the receiver 100 to the next antenna 108 is triggered based on a predicted packet error rate (PER) 110 associated with a current receive path 112 of the receiver 100 and a packet error history (e.g., a CRC error) associated with one or more previous receive paths (not shown). It is appreciated that the forwarding of the control signal 104 is based on the predicted PER 110, the history of the predicted PER 110, the history of signals coming from the CRC and, if available, the target PER 118 and/or a maximal admissible delay 120 (e.g., a delay constraint).

In one example embodiment, the current receive path 112 is used to process multi-carrier modulated signals received via the currently active antenna 106. In one exemplary implementation, the multi-carrier modulated signals include orthogonal frequency division multiplexing (OFDM) signals according to the IEEE 802.11a/g/n, WiMax 802.16d/e, UMTS-LTE, and DVB-H/T standard. Further, as shown in FIG. 1, the receiver 100 includes a switch module 114 for performing the switch from the currently active antenna 106 to the next antenna 108 based on the control signal 104. In one example embodiment, the switch from the currently active antenna 106 to the next antenna 108 is not nullified if the multi-carrier modulated signals exhibit a delay less than a maximal admissible delay 120 between two subsequent packet receptions.

In accordance with the above-described embodiments, the receiver 100 includes a link quality metric module 116 coupled to the antenna selection module 102 for computing the predicted PER 110. Further, the predicted PER 110 is computed based on an effective mutual information ($I_{eff}$), an effective signal to noise ratio ($SNR_{eff}$) and a packet length of the multi-carrier modulated signals received via the currently active antenna 106. In one embodiment, the effective mutual information is calculated using:

$$I_{eff} = \frac{1}{N}\sum_{K=1}^{N} I(SNR(k)),$$

where the SNR(k) is a signal-to-noise ratio per subcarrier k of the multi-carrier modulated signals, and the N is a number of subcarriers for the multi-carrier modulated signals. In one exemplary implementation, the effective mutual information ($I_{eff}$) takes into account performances of components in the receiver 100, channel estimates, and noise variances associated with the multi-carrier modulated signals.

In another embodiment, the effective mutual information may be directly obtained from the symbols forwarded by the symbol-demapper (e.g., the output of the demodulator 124) and not from the channel estimates and the noise variance. In yet another embodiment, the effective SNR ($SNR_{eff}$) is calculated using:

$$SNR_{eff} = -\beta \log\left(\frac{1}{N}\sum_{K=1}^{N} \exp\left(-\frac{SNR(k)}{\beta}\right)\right),$$

where the $\beta$ is an optimization factor.

Further as shown in FIG. 1, the receiver 100 includes a channel estimator module 122 coupled to the link quality metric module 116 for generating the channel estimates associated with the multi-carrier modulated signals. Also, in FIG. 1, the receiver 100 includes a demodulator module 124 coupled to the channel estimator module 122 for isolating data signals from the multi-carrier modulated signals. The receiver 100 also includes a decoder module 126 coupled to the demodulator module 124 for decrypting the data signals into their original forms. Further as shown in FIG. 1, the receiver 100 includes a cyclic redundancy check (CRC) module 128 coupled to the decoder module 126 for detecting a CRC error of the data signals associated with the current receive path 112. It should be noted that, the CRC error is associated with the packet error history that corresponds to one or more previous receive paths. Furthermore, the receiver 100 includes a front end module 130 coupled to the switch module 114 for transforming the multi-carrier modulated signals between an analog format and a digital format. In one embodiment, the multi-carrier modulated signals in the digital format are forwarded from the front end module 130 to the channel estimator 122 and the demodulator 124.

Figure 2:
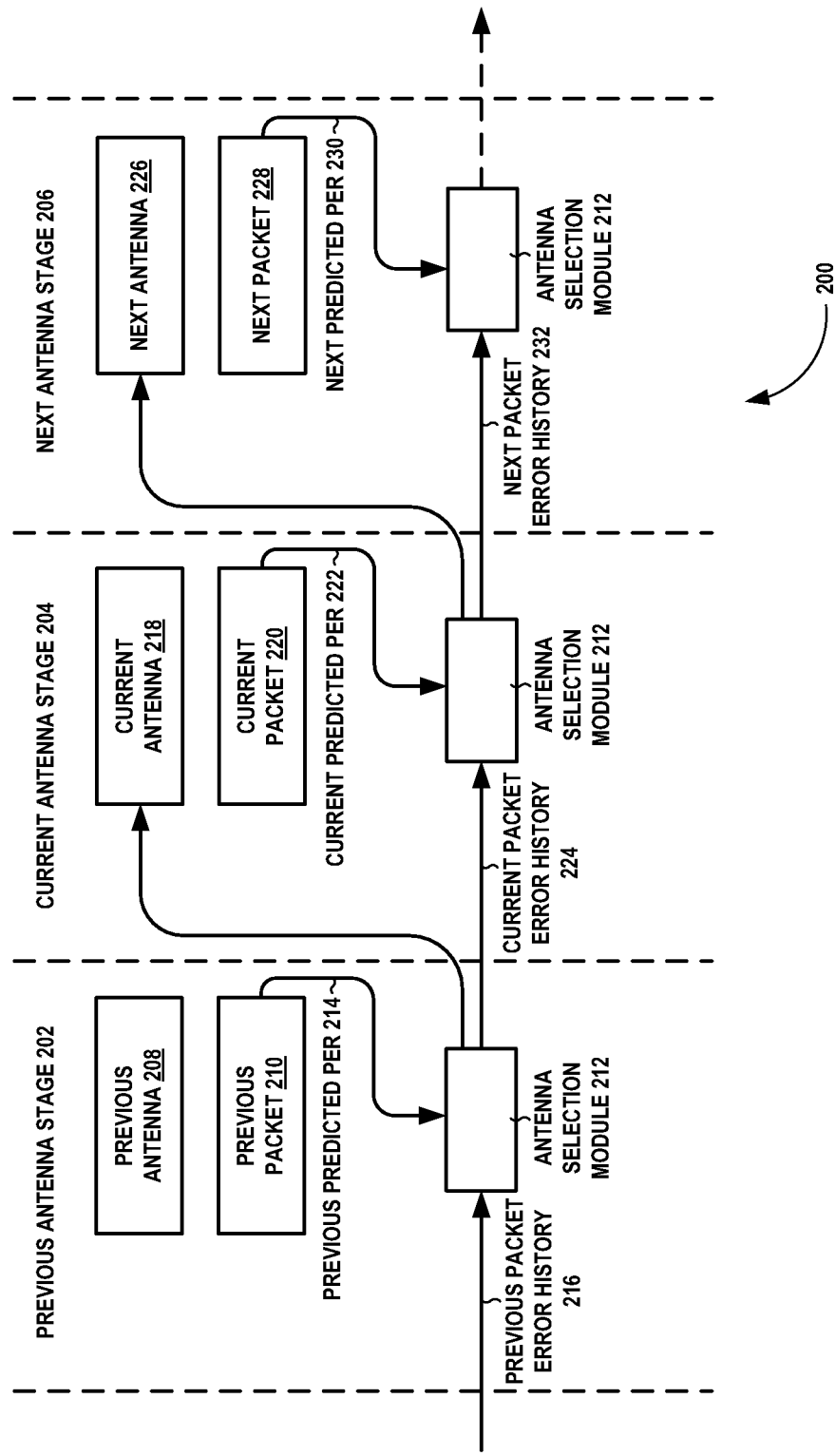
FIG. 2 is a temporal view of an exemplary system for selecting an antenna from multiple receiver antennas, according to one embodiment.

FIG. 2 is a temporal view 200 of an exemplary system for selecting an antenna from multiple receiver antennas, according to one embodiment. Particularly, FIG. 2 illustrates ordering and time relation between antenna selection decision and packets received via the selected antenna. In FIG. 2, the temporal view 200 illustrates a previous antenna stage 202, a current antenna stage 204 and a next antenna stage 206. As shown in FIG. 2, during the previous antenna stage 202, a previous packet 210 is received via a previous antenna 208.

Further, an antenna selection module 212 triggers a switch from the previous antenna 208 to a current antenna 218 based on a previous predicted PER 214 and a previous packet error history 216 associated with the previous packet 210. It is appreciated that the antenna selection module 212 is an exemplary embodiment of the antenna selection module 102 of FIG. 1. Further, as shown in FIG. 2, a current packet 220 is received via the current antenna 218 during the current antenna stage 204. It is also appreciated that the history of the predicted PER 214 can be used to detect a degrading reception quality, thus influencing the time for antenna switching.

Further, during the current antenna stage 204, the antenna selection module 212 triggers the switch from the current antenna 218 to a next antenna 226 based on a current predicted PER 222 and a current packet error history 224. The next antenna 226 is associated with a next packet 228 received during the next antenna stage 206. Furthermore, a next predicted PER 230 and a next packet error history 232 associated with the next packet 228 are estimated and used by the antenna selection module 212 for selecting a suitable antenna of the multiple receiver antennas. In this manner, the antenna selection module 212 selects a next antenna for receiving multi-carrier modulated signals based on a predicted PER and a packet error history of a currently active antenna and the history of all other antennas.

Figure 3:
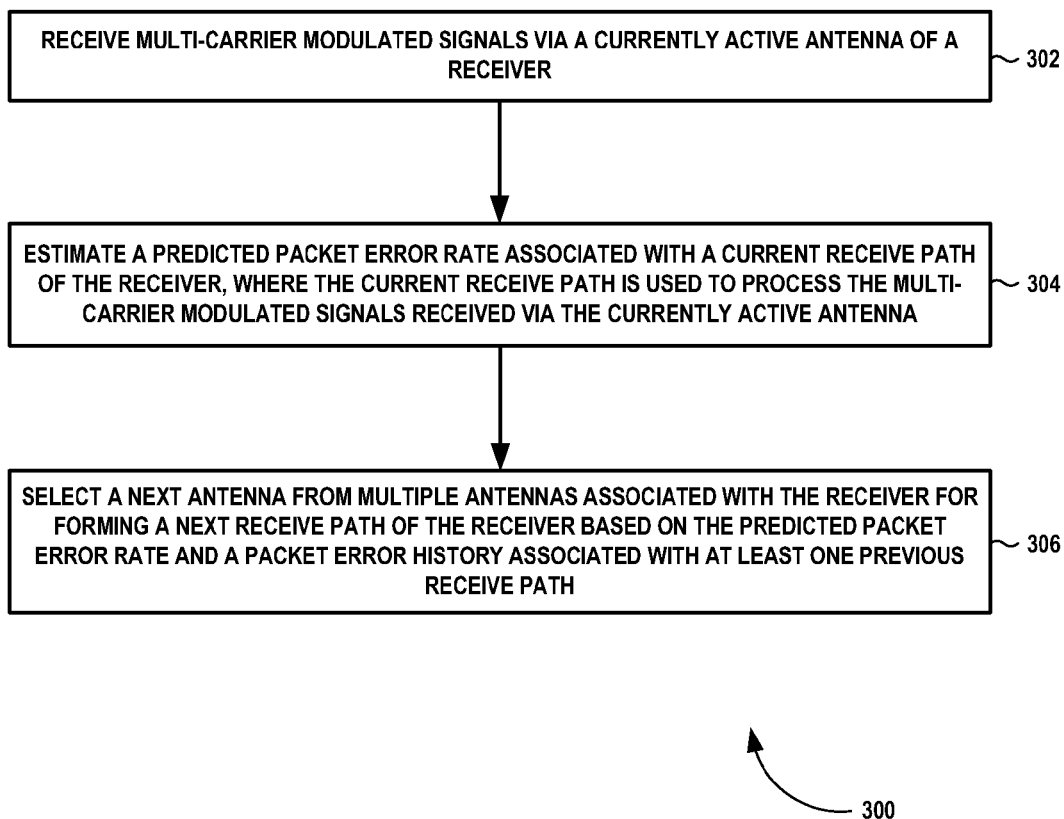
FIG. 3 is a process flow chart of an exemplary method for selecting an antenna from multiple receiver antennas, according to one embodiment.

FIG. 3 is a process flow chart 300 of an exemplary method for selecting an antenna from multiple receiver antennas, according to one embodiment. In operation 302, multi-carrier modulated signals are received via a currently active antenna of a receiver. In one exemplary implementation, the multi-carrier modulated signals include OFDM signals.

In operation 304, a predicted PER associated with a current receive path of the receiver is estimated. In one exemplary implementation, the current receive path is used to process the multi-carrier modulated signals received via the currently active antenna. In one embodiment, the predicted PER is computed by using an effective mutual information ($I_{eff}$), an effective signal-to-noise ratio ($SNR_{eff}$), and a packet length of the multi-carrier modulated signals.

In operation 306, a next antenna is selected from the multiple antennas associated with the receiver to form a next receive path based on the predicted PER and a packet error history associated with one or more previous receive paths. In one example embodiment, the packet error history includes a CRC error which corresponds to the one or more previous receive paths. In one embodiment, CRC errors of all receive paths may be included. Moreover, the method may be in a form of a machine-readable medium embodying a set of instructions that, when executed by a machine, cause the machine to perform the method of FIG. 3.

The above described system and/or method enhances stability of communication links. Although the present embodiments have been described with reference to specific example embodiments, it will be evident that various modifications and changes may be made to these embodiments without departing from the broader spirit and scope of the various embodiments.

For example, the various devices, modules, analyzers, generators, etc. described herein may be enabled and operated using hardware circuitry (e.g., CMOS based logic circuitry), firmware, software and/or any combination of hardware. For example, the various electrical structure and methods may be embodied using transistors, logic gates, and electrical circuits (e.g., application specific integrated ASIC circuitry).

What is claimed is:

1. A system for selecting an antenna from a plurality of antennas associated with a receiver, comprising:
an antenna selection module for forwarding a control signal which triggers a switch from a currently active antenna of the receiver to a next antenna based on a predicted packet error rate (PER) associated with a current receive path of the receiver and a packet error history associated with at least one previous receive path, wherein the packet error history comprises at least one CRC error which corresponds to the at least one previous receive path and wherein the current receive path is used to process multi-carrier modulated signals received via the currently active antenna;

a switch module for performing the switch from the currently active antenna to the next antenna based on the control signal; and a link quality metric module coupled to the antenna selection module for computing the predicted PER based on an effective mutual information ($I_{eff}$), wherein the effective mutual information ($I_{eff}$) takes account performances of components in the receiver, channel estimates, and noise variances associated with the multi-carrier modulated signals.

2. The system of claim 1, wherein the effective mutual information ($I_{eff}$) is calculated using:

$$I_{eff} = \frac{1}{N} \sum_{K=1}^{N} I(SNR(k)),$$

with the SNR(k) being a signal-to-noise ratio per subcarrier k of the multi-carrier modulated signals and with the N being a number of subcarriers for the multi-carrier modulated signals.

3. The system of claim 2, wherein the link quality metric module for computing the predicted PER based on an effective SNR ($SNR_{eff}y$) using:

$$SNR_{eff} = -\beta \log\left(\frac{1}{N} \sum_{K=1}^{N} \exp\left(-\frac{SNR(k)}{\beta}\right)\right),$$

with the $\beta$ being an optimization factor.

4. The system of claim 3, wherein the effective mutual information ($I_{eff}$), the effective SNR ($SNR_{eff}$), and a packet length of the multi-carrier modulated signals are used to compute the predicted PER.

5. The system of claim 4, wherein the forwarding the control signal is based on a comparison of the predicted PER with a target PER.

6. The system of claim 1, further comprising a channel estimator module coupled to the link quality metric module for generating the channel estimates associated with the multi-carrier modulated signals.

7. The system of claim 6, further comprising a demodulator module coupled to the channel estimator module for isolating data signals from the multi-carrier modulated signals.

8. The system of claim 7, further comprising a decoder module coupled to the demodulator module for decrypting the data signals into their original forms.

9. The system of claim 8, further comprising a cyclic redundancy check (CRC) module coupled to the decoder module for detecting a CRC error of the data signals associated with the current receive path, wherein the CRC error is associated with the packet error history.

10. The system of claim 9, further comprising a front end module coupled to the switch module for transforming the multi-carrier modulated signals between an analog format and a digital format.

11. A system for selecting an antenna from a plurality of antennas associated with a receiver, comprising:

an antenna selection module for forwarding a control signal which triggers a switch from a currently active antenna of the receiver to a next antenna based on a predicted packet error rate (PER) associated with a current receive path of the receiver and a packet error history associated with at least one previous receive path, wherein the switch from the currently active antenna to the next antenna is not nullified if the multi-carrier modulated signals exhibit a delay less than a maximal admissible delay between two subsequent packet receptions, and wherein the current receive path is used to process multi-carrier modulated signals received via the currently active antenna; and a switch module for performing the switch from the currently active antenna to the next antenna based on the control signal.

12. The system of claim 11, wherein the multi-carrier modulated signals comprise orthogonal frequency division multiplexing (OFDM) signals.

13. A method for selecting an antenna from a plurality of antennas associated with a receiver, comprising:

receiving multi-carrier modulated signals via a currently active antenna of the receiver;

estimating a predicted packet error rate (PER) associated with a current receive path of the receiver, wherein the current receive path is used to process the multi-carrier modulated signals received via the currently active antenna, wherein an effective mutual information ($I_{eff}$), an effective SNR ($SNR_{eff}$), and a packet length of the multi-carrier modulated signals are used to compute the predicted PER; and selecting a next antenna from the plurality of antennas for forming a next receive path of the receiver based on the predicted PER and a packet error history associated with at least one previous receive path.

14. The method of claim 13, wherein the packet error history comprises at least one CRC error which corresponds to the at least one previous receive path.

15. The method of claim 13, wherein the multi-carrier modulated signals comprise orthogonal frequency division multiplexing (OFDM) signals.

16. A receiver, comprising:

a plurality of antennas;

an antenna selection module for forwarding a control signal which triggers a switch from a currently active antenna of the plurality of antennas to a next antenna of the plurality of antennas based on a predicted packet error rate (PER) associated with a current receive path of the receiver and a packet error history associated with at least one previous receive path, wherein the packet error history comprises at least one CRC error which corresponds to the at least one previous receive path, and wherein the current receive path is used to process multi-carrier modulated signals received via the currently active antenna and wherein an effective mutual information ($I_{eff}$), is used to compute the predicted PER; and a switch module for performing the switch from the currently active antenna to the next antenna based on the control signal.

17. The receiver of claim 16, wherein the multi-carrier modulated signals comprise orthogonal frequency division multiplexing (OFDM) signals according to IEEE 802.11a/g/n, WiMax 802.16d/e, UMTS-LTE, and DVB-H/T standard.

18. The receiver of claim 16, wherein the predicted PER is further computed based on an effective SNR ($SNR_{eff}$), and a packet length of the multi-carrier modulated signals.

19. A non-transitory computer readable medium having stored thereon instructions selecting an antenna from a plurality of antennas associated with a receiver comprising machine executable code which when executed by a computing machine, causes the machine to perform steps comprising:

receiving multi-carrier modulated signals via a currently active antenna of the receiver;

estimating a predicted packet error rate (PER) associated with a current receive path of the receiver, wherein the current receive path is used to process the multi-carrier modulated signals received via the currently active antenna, wherein an effective mutual information ($I_{eff}$) is used to compute the predicted PER; and selecting a next antenna from the plurality of antennas for forming a next receive path of the receiver based on the predicted PER and a packet error history associated with at least one previous receive path.

20. The medium of claim 19, wherein the predicted PER is further computed based on an effective SNR ($SNR_{eff}$), and a packet length of the multi-carrier modulated signals.

21. The medium as set forth in claim 19, wherein the packet error history comprises at least one CRC error which corresponds to the at least one previous receive path.

\* \* \* \* \*